United States Patent
Leinonen et al.

(10) Patent No.: US 7,535,413 B2
(45) Date of Patent: May 19, 2009

(54) RECEPTION OF SIGNALS IN A DEVICE COMPRISING A TRANSMITTER

(75) Inventors: Marko Leinonen, Oulu (FI); Seppo Rousu, Oulu (FI)

(73) Assignee: Nokia Corporation, Espoo (FI)

( * ) Notice: Subject to any disclaimer, the term of this patent is extended or adjusted under 35 U.S.C. 154(b) by 43 days.

(21) Appl. No.: 10/560,550

(22) PCT Filed: Jun. 10, 2003

(86) PCT No.: PCT/IB03/02184

§ 371 (c)(1),
(2), (4) Date: Dec. 12, 2005

(87) PCT Pub. No.: WO2004/109940

PCT Pub. Date: Dec. 16, 2004

(65) Prior Publication Data

US 2006/0125684 A1 Jun. 15, 2006

(51) Int. Cl.
*G01S 1/00* (2006.01)
*H04B 17/00* (2006.01)

(52) U.S. Cl. .................. 342/357.01; 342/357.09; 455/67.13

(58) Field of Classification Search ....... 342/357.01–17
See application file for complete search history.

(56) References Cited

U.S. PATENT DOCUMENTS

| | | | | |
|---|---|---|---|---|
| 5,678,169 A * | 10/1997 | Turney | ............. | 455/1 |
| 5,691,497 A | 11/1997 | Kenworthy | | |
| 5,912,641 A * | 6/1999 | Dietrich | ............. | 342/354 |
| 6,097,336 A * | 8/2000 | Stilp | ............. | 342/357.02 |
| 6,107,960 A * | 8/2000 | Krasner | ............. | 342/357.09 |
| 6,144,473 A | 11/2000 | Rokhsaz et al. | | |
| 6,188,678 B1 * | 2/2001 | Prescott | ............. | 370/318 |
| 6,442,375 B1 | 8/2002 | Parmentier | | |
| 6,510,308 B1 * | 1/2003 | Thomas et al. | ............. | 455/63.1 |
| 6,591,091 B1 * | 7/2003 | Vorenkamp et al. | ...... | 455/179.1 |

(Continued)

FOREIGN PATENT DOCUMENTS

EP 1 091 497 A 11/1997

(Continued)

OTHER PUBLICATIONS www.esa.int/export/esaSA/navigation.html; downloaded from the Internet on Oct. 11, 2005.

(Continued)

*Primary Examiner*—Thomas H Tarcza
*Assistant Examiner*—Harry Liu (57) ABSTRACT

A device 1 comprises a communication system transmitter 30 for transmitting signals via a radio interface in a first frequency band. The device further comprises a receiver 10 for receiving signals via a radio interface in a second frequency band. The receiver 10 includes an attenuating component 13 for attenuating signals received by the receiver 10. Moreover, the device comprises a controlling portion 50 setting an attenuation which is applied by the attenuating component 13 to received signals to a higher value, in case the communication system transmitter 30 transmits signals with a power level exceeding a certain value, and setting an attenuation which is applied by the attenuating component 13 to received signals to a lower value, in case no signal is transmitted by the communication system transmitter 30. The invention relates equally to a corresponding method.

32 Claims, 2 Drawing Sheets

U.S. PATENT DOCUMENTS

| | | | |
|---|---|---|---|
| 6,675,003 B1 * | 1/2004 | Dubash et al. | 455/302 |
| 6,728,637 B2 * | 4/2004 | Ford et al. | 701/213 |
| 6,784,830 B1 * | 8/2004 | Lawrence et al. | 342/357.12 |
| 6,917,328 B2 * | 7/2005 | Rabinowitz et al. | 342/357.06 |
| 2002/0081987 A1 * | 6/2002 | Yoshida et al. | 455/277.1 |
| 2003/0026417 A1 * | 2/2003 | Belt et al. | 379/387.01 |
| 2003/0055562 A1 * | 3/2003 | Levy et al. | 701/214 |
| 2003/0145328 A1 * | 7/2003 | Rabinowitz et al. | 725/72 |
| 2004/0043745 A1 * | 3/2004 | Najarian et al. | 455/334 |
| 2004/0176034 A1 * | 9/2004 | Hunter et al. | 455/63.1 |
| 2004/0239559 A1 * | 12/2004 | King et al. | 342/357.12 |

FOREIGN PATENT DOCUMENTS

| | | |
|---|---|---|
| EP | 1079533 | 2/2001 |
| EP | 1122554 | 8/2001 |
| EP | 1 253 720 A | 10/2002 |

OTHER PUBLICATIONS

Europa.eu.int/comm/dgs/energy_transport/galileo/index_en.htm; downloaded from the Internet on Oct. 11, 2005.

Europa.eu.int/comm/dgs/energy_transport/galileo/documents/technical_en.htm; downloaded from the Internet on Oct. 11, 2005.

"Future GPS and Galileo Signals, Unprecedented Accuracy and Availability;" Kees de Jong; GEO Informatics; Sep. 2002.

The Galileo Frequency Structure and Signal Design; G. Hein et al.

"Status of Galileo Frequency and Signal Design"; G. Hein et al.

"Galileo: Satellite System Design and Technology Developments;" J. Benedicto et al; ESA; Nov. 2000.

Galileo, The European Programme for Global Navigation Services; ESA.

* cited by examiner

RECEPTION OF SIGNALS IN A DEVICE COMPRISING A TRANSMITTER

CROSS REFERENCE TO RELATED APPLICATIONS

This application is for entry into the U.S. national phase under §371 for International Application No. PCT/IB03/002184 having an international filing date of Jun. 10, 2003, and from which priority is claimed under all applicable sections of Title 35 of the United States Code including, but not limited to, Sections 120, 363 and 365(c).

FIELD OF THE INVENTION

The invention relates to a device comprising a communication system transmitter for transmitting signals via a radio interface in a first frequency band and a receiver for receiving signals via a radio interface in a second frequency band. The invention relates equally to a method for improving the performance of such a receiver, which is combined in a single device with a communication system transmitter.

BACKGROUND OF THE INVENTION

A communication system transmitter for transmitting signals via a radio interface is known for example as part of a communication system transceiver of a device, which enables a GSM (Global System for Mobile communications), US-TDMA (US Time Division Multiple Access or IS-136), CDMA (Code Division Multiple Access) or WCDMA (Wideband CDMA) communication of the device with some communication network. Further, a receiver operating at a different frequency band than such a communication system can be for example a satellite positioning system receiver, like a GPS (Global Positioning System) receiver of a GPS system. A communication system transceiver operating at a first frequency band and a receiver operating at a second frequency band can also be implemented together in a single device, for instance in a mobile phone.

A receiver, however, may not perform well during the time intervals in which a communication system transmitter implemented in the same device is transmitting. More specifically, in case the transmission by the communication system transmitter in the first frequency band generates wideband noise in the second frequency band, this wideband noise deteriorates the performance of the receiver receiving signals in the second frequency band.

Figure 1:
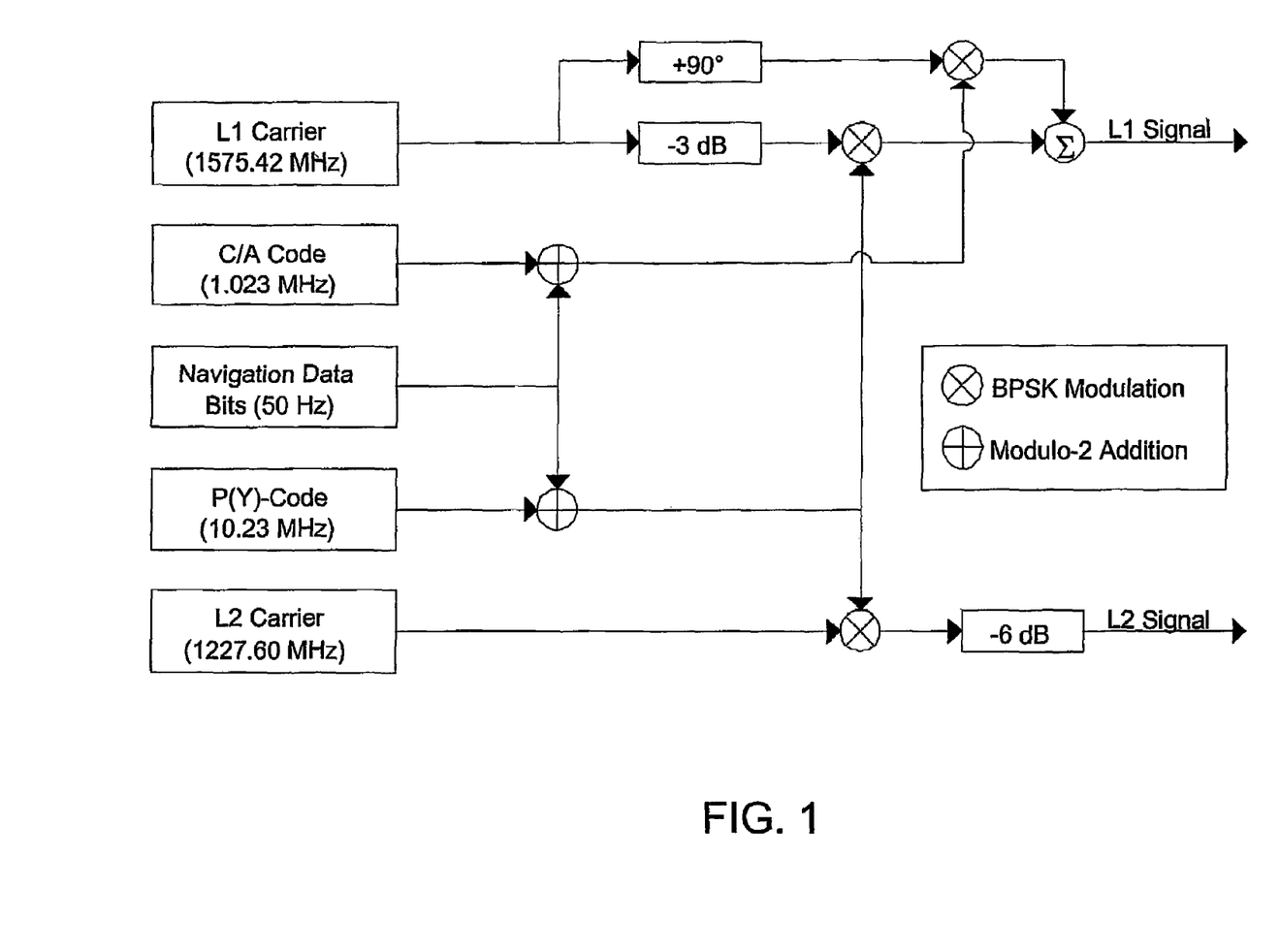
FIG. 1 illustrates the modulation of GPS carrier frequencies.

In a GPS system, for example, several GPS satellites that orbit the earth transmit signals which are received and evaluated by GPS receivers. All GPS satellites use the same two carrier frequencies L1 and L2 of 1575.42 MHz and 1227.60 MHz, respectively. The modulation of these carrier frequencies L1 and L2 is illustrated in FIG. 1. After a phase shift of 90 degrees, the sinusoidal L1 carrier signal is BPSK modulated by each satellite with a different C/A (Coarse Acquisition) code known at the receivers. Thus, different channels are obtained for the transmission by the different satellites. The C/A code, which is spreading the spectrum over a 1.023 MHz bandwidth, is a pseudorandom noise sequence which is repeated every 1023 chips, the epoch of the code being 1, ms. The term chips is used to distinguish the bits of a modulation code from data bits. In parallel, the L1 carrier signal is BPSK modulated after an attenuation by 3 dB with a P-code (Precision code), and the L2 carrier signal is BPSK modulated with the same P-code before an attenuation by 6 dB. Before transmission, the two differently modulated parts of the L1 carrier signal are summed again. The L2 carrier signal carries currently only the P-code. The P-code is much longer than the C/A code. Its chip rate is 10.23 MHz and it repeats every 7 days. In addition, the P-code is currently encrypted, and for that reason it is often referred as P(Y)-code. Decryption keys needed for using the P(Y)-code are classified and civil users cannot access them. Therefore, only the L1 carrier C/A code is usable in civil GPS receivers.

Before the C/A-code and the P(Y)-code are modulated onto the L1 signal and the L2 signal, navigation data bits are added to the C/A- and P(Y)-codes by using a modulo-2 addition with a bit rate of 50 bits/s. The navigation information, which constitutes a data sequence, can be evaluated for example for determining the position of the respective receiver. The L1 signal which is received at a receiver is further modulated due to the Doppler effect and possibly due other higher order dynamic stresses.

The reception bandwidth of a GPS receiver receiving the modulated satellite signals is related to the reception code. For example, if GPS is based on the L1 carrier C/A code, then the signal requires a frequency band of 1575.42 MHz +/−5 MHz. If a P-code capable receiver is used, then the GPS receiver reception band is much wider, it is likely to be 1575.42 MHz +/−24 MHz. The actual used GPS reception bandwidth is further related to the actual implementation, and thus the previously mentioned bandwidths are presented for demonstration purposes. The mentioned GPS bandwidth will thus be used in the following only by way of example.

The GPS standard is currently under modernization. One of the main components of the modernization consists in two new navigation signals that will be available for civil use in addition to the existing civilian service broadcast of the L1-C/A code at 1575.42 MHz.

The first one of these new signals will be a C/A code located at 1227.60 MHz, i.e. modulated onto the L2 carrier frequency, and will be available for general use in non-safety critical applications. The new civilian signal at L2, referred to as "L2CS", will generally be characterized by a 1.023 Mcps (mega chips per second) effective ranging code having a Time Division Multiplex of two ½ rate codes. The L2CS signal will be BPSK modulated onto the L2 carrier, along with the P(Y)-code. This C/A code will be available beginning with the initial GPS Block IIF satellite scheduled for launch in 2003.

The second one of the new signals will be using a third carrier frequency L5 located at 1176.45 MHz. The L5 carrier frequency will be modulated with C/A codes, more specifically with a CL code of 767,250 chips and a CM code of 10,230 chips. The L5 signal will provide a 10.23 Mcps ranging code, wherein it is expected that improved cross correlation properties will be realized. The L5 signal will be message based. It will include an I (In-phase) channel carrying 10-symbol Neumann/Hoffman encoding and a Q (Quadrature) channel carrying 20-symbol Neumann/Hoffman encoding. The I and Q channels will be orthogonally modulated onto the L5 carrier. The L5 signal falls into a frequency band which is protected worldwide for aeronautical radionavigation, and therefore it will be protected for safety-of-life applications. Additionally, it will not cause any interference to existing systems. Thus, with no modification of existing systems, the addition of the L5 signal will make GPS a more robust radionavigation service for many aviation applications, as well as for all ground-based users, like maritime, railways, surface, shipping, etc. The new L5 signal will be available on GPS Block IIF satellites scheduled for launch beginning in 2005.

At the current GPS satellite replenishment rate, all three civil signals, i.e. L1-C/A, L2-C/A and L5, will be available for initial operational capability by 2010, and for full operational capability approximately by 2013.

Measurements show that if no measures are taken, the SNR (signal-to-noise ratio) of a GPS signal received by a GPS receiver degrades by about 2 dB in case a GSM transmitter implemented in the same device uses for transmissions a single slot TX (transmission) mode, and by about 3 dB in case the GSM transmitter implemented in the same device uses for transmissions a dual slot TX mode.

In particular communication systems operating in the 1900 band, like GSM1900, which are widely referred to as PCS (Personal Communication System), and communication systems operating in the 1800 band, like GSM1800, which are widely referred to as DCS (Digital Communication System), will generate wideband noise in this GPS L1 band of 1575.42 MHz +/−5 MHz, when C/A code supported GPS is used. When new L2 and L5 frequency GPS signals are used, then lower frequency GSM signals, i.e. GSM900 and GSM800, will generate the same wide band noise problem as GSM1800 to the L1 GPS signal.

The same problem may further occur when a Galileo receiver is used instead of a GPS receiver. Galileo is a European satellite positioning system, for which the beginning of commercial operations is scheduled for 2008. Galileo comprises 30 satellites, which are distributed to three circular orbits to cover the entire surface of the Earth. The satellites will further be supported by a worldwide network of ground stations. It is planned that Galileo will provide ten navigation signals in Right Hand Circular Polarization (RHCP) in the frequency ranges 1164-1215 MHz, using carrier signals E5a and E5b, 1215-1300 MHz, using a carrier signal E6, and 1559-1592 MHz, using a carrier signal E2-L1-E1. Similarly as with GPS, the carrier frequencies E5a, E5b, E6 and E2-L1-E1 will be modulated by each satellite with several PRN codes spreading the spectrum and with data. Thus, GSM transmitters may equally generate wideband interferences in frequency bands employed by Galileo.

Obviously, other combinations of a communication system transmitter and a receiver in a single device may lead as well to the same problem.

In U.S. Pat. No. 6,107,960, it was proposed that a control signal is transmitted from the communication transceiver to the satellite positioning system receiver, when the communication transceiver transmits data at a high power level over a communication link. The control signal causes the satellite positioning system signals from satellites to be blocked from the receiving circuits of the satellite positioning system receiver, or to be disregarded by the processing circuits of the satellite positioning system receiver.

In a device using a GPS receiver and a GSM transceiver, blocking or disregarding the GPS signals while the GSM transceiver is transmitting at high power level results in case of single slot GSM in theory in a loss of 0.577 ms of the GPS information in 4.616 ms, which is equivalent to a GPS sensitivity loss of 0.6 dB. In case of dual slot GSM, such blocking or disregarding results in a loss of 1.154 ms of GPS information in 4.616 ms, which is equivalent to a GPS sensitivity loss of 1.2 dB.

It has further been proposed to improve the SNR of received satellite signals by adding an external notch-filter to the transmission path of the communication system transmitter. The notch filter, which is arranged after a power amplifier in the transmission path, has a pass band frequency range for passing on the frequencies required for the communication system, and a stop band frequency range for attenuating the frequencies required for the satellite positioning system.

For PCS and DCS, the pass band frequency range of the notch filter has to be 1710 MHz to 1910 MHz, and in case GPS is used as satellite positioning system, the stop band frequency range has to be 1558.42 MHz to 1580.43 MHz. In order to improve the SNR of received GPS signals to a useful level, a very high attenuation is required for the stop band. Applying a high attenuation, however, increases also the insertion loss of the notch filter at the pass band of the filter. Due to this additional loss after the power amplifier, more output power has to be taken from the power amplifier, which increases the current consumption.

Measurements show that an antenna isolation of about 10 dB is required for single slot GSM, if the GPS SNR is to be improved to a desired level of 0.5 dB degradation. To a GSM1800 transmission path, a 30 dB external GPS band attenuator has to be added for achieving the same desired level of 0.5 dB degradation. For dual slot GSM, the required attenuation is even higher.

The insertion loss of a GPS notch-filter with 30 dB GPS band attenuation will be somewhere between 0.7 dB and 1.0 dB. An insertion loss between 0.7 dB and 1.0 dB increases the current consumption of the power amplifier by about 20%, compared to a current consumption without insertion loss.

It is thus a disadvantage of the approach using a notch-filter that an extra component is needed and that the power amplifier current consumption increases about 20%. Thus, the costs for improving the GPS SNR by only about 1.5 dB are high.

SUMMARY OF THE INVENTION

It is an object of the invention to provide an alternative to existing solutions for improving the performance of a receiver during the transmissions of a communication system transmitter, which is implemented in the same device as the receiver.

On the one hand, a device is proposed, which comprises a communication system transmitter for transmitting signals via a radio interface in a first frequency band. The communication system transmitter may include a variable amplifier for amplifying signals that are to be transmitted by the communication system transmitter with varying power levels. The proposed device further comprises a receiver for receiving signals in a second frequency band. The receiver includes an attenuating component for attenuating signals received by the receiver. The proposed device moreover comprises a controlling portion setting an attenuation which is applied by the attenuating component to signals received by the receiver to a higher value in case the communication system transmitter transmits signals with a power level exceeding a certain value, and setting an attenuation which is applied by the attenuating component to signals received by the receiver to a lower value in case no signal is transmitted by the communication system transmitter. The attenuation which is set as proposed by the controlling portion is either the only attenuation applied to signals by the receiver or an extra attenuation.

On the other hand, a method for improving the performance of a receiver is proposed. The receiver is combined in a single device with a communication system transmitter transmitting signals via a radio interface in a first frequency band, and the receiver receives signals via a radio interface in a second frequency band. The proposed method comprises attenuating a signal received by the receiver with a higher attenuation, in case the communication system transmitter transmits signals with a power level exceeding a certain value, and attenuating a signal received by the receiver with a lower attenuation, in case no signal is transmitted by the communication system transmitter.

It is to be noted that without an indication to the contrary, any subsequent reference to a receiver will relate to such a receiver operating at a different frequency band than a communication system transmitter.

The invention proceeds from the consideration that it is better for the performance of certain receivers to receive signals with a particularly low SNR than not to receive any signal at all during short time intervals. In the case of GPS, for example, when no signal is present at a GPS receiver, this emulates the situation that a very high attenuation fading is present in the atmosphere. The performance of the GPS receiver with a fading signal is an implementation related issue. The implementation determines how tracking and other algorithms work in the presence of very low GPS signal levels. It is therefore proposed that when the communication system transmitter of a device is transmitting with a high power level, a high attenuation is applied to the signals received by the receiver, in order to attenuate an incoming signal to a desired level for further processing. When the communication system transmitter of the device is not transmitting any signals or transmitting signals having a low power level, in contrast, no attenuation or a low attenuation is applied to the signals received by the receiver, since in this case, the wide band noise level is usually sufficiently low for an evaluation of received signals by the receiver.

It is an advantage of the invention that it provides an alternative to existing solution.

It is further an advantage of the invention that it is easy to implement. The proposed attenuation can be achieved with an external attenuator in a receiver chain of the receiver or with an integrated AGC (Automatic Gain Control) functionality in a receiver chain of the receiver. In a GPS receiver, for instance, such an AGC functionality is already built-in.

It is further an advantage of the invention, that it does not lead to an increase in the current consumption of a power amplifier of the communication system transmitter.

It is equally an advantage of the invention that it performs better than the approach presented in the above mentioned U.S. Pat. No. 6,107,960, since the approach according to the invention is adaptable to the respective operation condition. In some cases, a signal reaching the device may be so strong that it has a sufficiently high SNR in spite of a generated wideband noise and further so strong that it can be evaluated in the receiver in spite of an applied attenuation. Thus, in certain cases, the reception by the receiver can be maintained even with a transmission by the communication system transmitter which leads to an attenuation of a received signal in the receiver, which is not possible when the reception of a signal is blocked completely or when a received signal is simply disregarded as proposed in U.S. Pat. No. 6,107,960.

Preferred embodiments of the invention become apparent from the dependent claims.

The attenuating component can be realized in various ways, either by a single unit or distributed to several units.

The attenuating component can comprise for example a variable gain amplifier, which is used exclusively for the extra attenuation according to the invention or in addition for a conventional automatic gain control. Such a variable gain attenuator is advantageously arranged after a first amplifier in a receiver chain of the receiver. An extra insertion loss before the first amplifier would degrade the sensitivity of the receiver, which is not desired.

The attenuating component can also be realized with a low noise amplifier (LNA) of the receiver, for instance by making use of a gain step function of an LNA. Such a gain step function is used in cellular mobile phones in order to keep the receiver operating at a linear mode when high level input signals are received.

The attenuating component can further comprise a component for reducing or shutting down the operation voltage for one or more of the receiver components, for instance for an LNA or for an amplifier. When no operation voltage is available for certain receiver components, a very high attenuation can be achieved. It has to be noted, however, that if the first components in the receiver chain of the receiver do not have a high gain, then the noise figure of the total receiver is rather high, which is not desired.

The attenuating component can also be a component which is able to detune an antenna connected to the receiver and receiving signals in the second frequency band.

Moreover, the attenuating component can comprise a variable amplifier of the receiver. The attenuation of received signals is then varied at least partly by varying an amplification factor of an amplification applied by the variable amplifier to received signals.

The attenuating component can apply the set attenuation on a received signal at radio frequency. Alternatively or in addition, the attenuating component can apply the set attenuation on an intermediate frequency signal, which is output by a converting component converting a received radio frequency signal into an intermediate frequency signal. Further alternatively or in addition, the attenuating component can apply the set attenuation on a baseband signal, which is provided by a converting component converting the intermediate frequency signal into a baseband signal.

Also the controlling portion can be realized in various ways, either by a single unit or distributed to several units.

The controlling portion can be located in a communication system section of the device including the communication system transmitter or in a receiver section of the device comprising the receiver. The controlling portion can also be at least partly external to both of these sections and/or be distributed to both sections. The controlling portion may include for instance at least a part of a processor provided in the communication system section and at least a part of a processor provided in the receiver section. To this end, the processors can be physically combined, or the controlling portion may combine information from both processors to determine a suitable attenuation. Such information may include for example the power level of any transmitted and received signals. In case the receiver comprises an AGC component, the controlling portion may also combine information provided by this AGC component and information provided by the communication system. The AGC component may indicate for example the attenuation that would be applied conventionally to signals received by the receiver. The controlling component can also be implemented in an AGC component.

Further, the attenuation applied by the attenuating component can be controlled in various ways by the controlling component.

In a first possible embodiment, an attenuation applied according to the invention to received signals can take only one of two predetermined values. The first, lower value is used when the communication system transmitter is not transmitting or using an amplification factor below a predetermined value for a transmission, and the second, higher value is used when the communication system transmitter is transmitting with a power level exceeding a predetermined value.

In a second, preferred embodiment, however, the attenuation of signals received by the receiver is adapted to the respective transmission noise level. More specifically, the higher the amplification which is applied to signals for a transmission by the communication system transmitter, the higher is the attenuation which is applied to the signals received by the receiver. Thereby, an optimum exploitation of received signals can be achieved.

In case of a strong signal in the second frequency band reaching the device and of a rather weak signal transmitted by the communication system transmitter, the SNR of the signal received by the receiver will still be high. In case of a weak signal in the second frequency band reaching the device and of a rather weak signal transmitted by the communication system transmitter, the SNR of the signal received by the receiver will be quite low. With a rather low attenuation applied to received signals corresponding to the low amplification applied to transmitted signals, the receiver will be able to process nevertheless the received signal having a high SNR, as this signal as a whole has a power level which is sufficiently high for an evaluation, but not the signal having a low SNR, as this signal as a whole has a power level which is too low for an evaluation.

In the second embodiment, the adjustment of the attenuation can be carried out either in predetermined steps or with a continuous scale. In particular if a discrete number of possible output power levels is used, e.g. five, a different attenuation value can be associated to each of these levels. Further, the increase of the attenuation starting from a predetermined low value, e.g. from an attenuation of zero, could begin only at a predetermined minimum amplification factor. Below this minimum amplification factor, the resulting wideband noise might be considered not to have a significant influence on the SNR of signals received by the receiver.

The controlling portion can control the attenuating component with an analog signal or a digital signal. In case of a control with a digital signal, the attenuation is preferably determined by the value of a control word.

The controlling portion can determine the desired attenuation based on the power level of signals transmitted by the communication system transmitter and/or on the power level of signals received by the receiver and/or the power level of signals received by an additional communication system receiver of the device. The power level of signals received by the receiver and of signals received by a communication system receiver of the device may contain an indication of the power level with which signals are transmitted by the communication system transmitter and accordingly an indication of an amplification factor currently employed by the communication system transmitter for transmitting signals. Thus, a high attenuation is selected if the power level of signals transmitted by the communication system transmitter exceeds a certain value and/or if the power level of signals received by the receiver exceeds a certain value and/or if the power level of signals received by the communication system receiver lies below a certain value. In addition, the attenuation may be increased with an increasing power level of signals transmitted by the communication system transmitter and/or with an increasing power level of signals received by the receiver and/or a decreasing power level of signals received by the communication system receiver. A combination of signals can be carried out by combining analog signals or digital signal information.

The invention can be employed in any device comprising a communication system transmitter transmitting signals in a first frequency band and a receiver receiving signals in a second frequency band.

The communication system transmitter can be for example, though not exclusively, part of a GSM transceiver, of a WCDMA-GSM transceiver, of a US-TDMA or of a CDMA transceiver. The invention is of particular advantage for communication systems using varying power levels.

The receiver can be for example a satellite positioning system receiver like a GPS receiver or a Galileo receiver, but equally any other type of receiver.

BRIEF DESCRIPTION OF THE FIGURES

Other objects and features of the present invention will become apparent from the following detailed description considered in conjunction with the accompanying drawing.

DETAILED DESCRIPTION OF THE INVENTION

Figure 2:
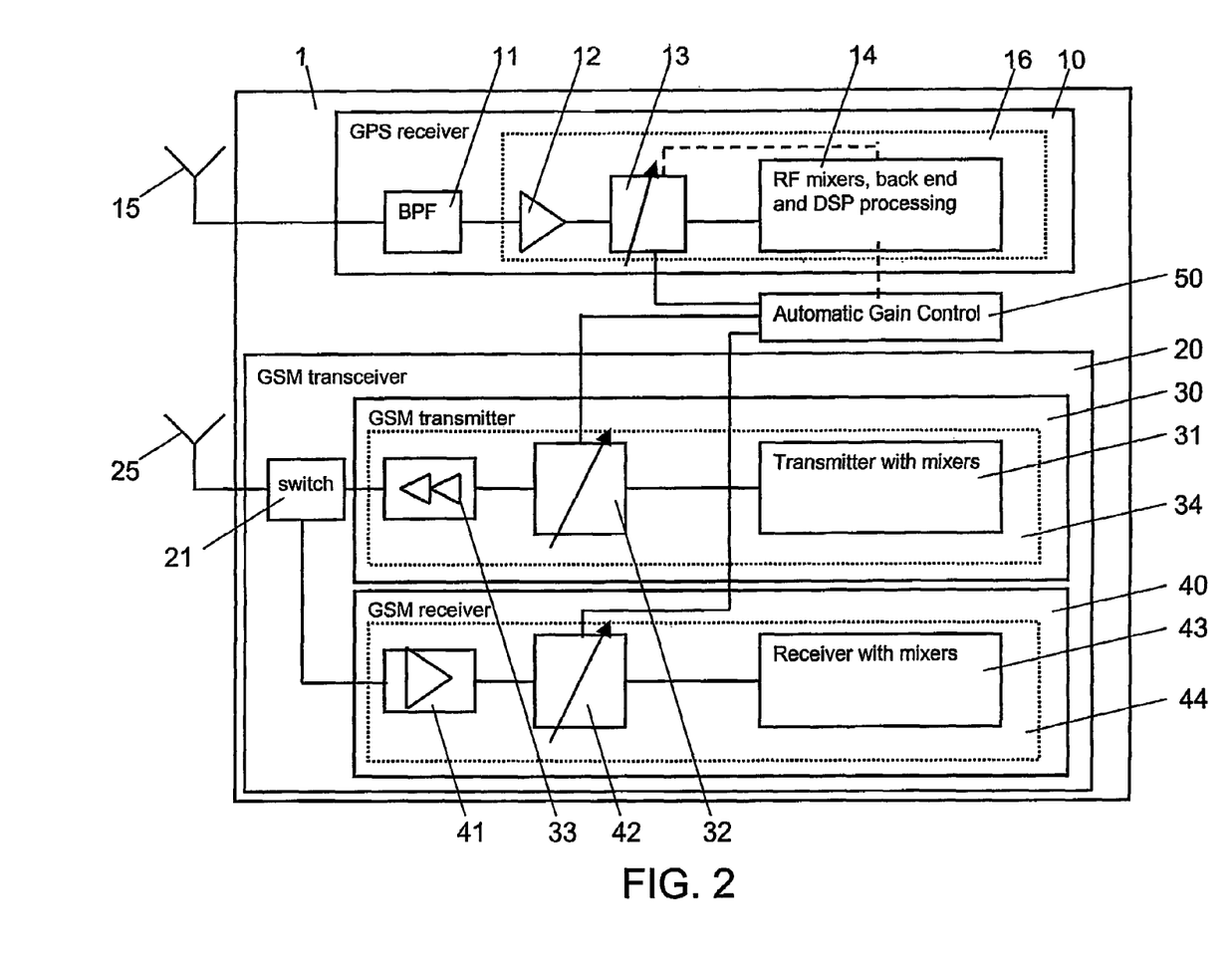
FIG. 2 is a schematic block diagram of a mobile phone, in which an embodiment of the invention is implemented.

FIG. 2 is a schematic block diagram of a mobile phone 1, in which an embodiment of the invention is implemented. Only those components of the mobile phone 1 which are of relevance to the invention are depicted.

The mobile phone 1 supports a GPS positioning and a mobile communication via a GSM network.

For supporting a GPS positioning, the mobile phone 1 comprises a GPS receiver 10. The GPS receiver 10 includes, connected to each other in series, a band pass filter BPF 11, an LNA 12, a variable gain attenuator 13 as attenuating component and a radio frequency RF back end and digital signal processor DSP (digital signal processor) processing block 14. The RF back end of the RF back end and DSP processing block 14 includes mixers. The RF back end and DSP processing block 14 has optionally a controlling access to the variable gain attenuator 13, which is indicated with a first dashed line. The mobile phone 1 further comprises a GPS antenna 15 which is connected to the band pass filter BPF 11 of the GPS receiver 10.

The LNA 12, the variable gain attenuator 13 and the RF back end and DSP processing block 14 are integrated in the presented embodiment into a single ASIC 16. This ASIC 16 is indicated in FIG. 2 with dotted lines. Alternatively, for example, only the variable gain attenuator 13 and the RF back end and DSP processing block 14 or only the LNA 12 and the RF back end and DSP processing block 14 could be integrated into a single ASIC.

For supporting a mobile communication, the mobile phone 1 comprises a GSM transceiver 20 with a GSM transmitter 30 and a GSM receiver 40.

The GSM transmitter 30 comprises, connected to each other in series, a transmitter with mixers block 31, a variable power amplifier 32 and an additional amplifier 33. If a super heterodyne transmitter is used, a gain control for the variable power amplifier 32 can be distributed to several intermediate frequencies in the transmitter with mixers block 31.

The transmitter with mixers block 31, the variable power amplifier 32 and the additional amplifier 33 are integrated in the presented embodiment into a single ASIC 34. This ASIC 34 is indicated in FIG. 2 with dotted lines. Alternatively, for example, only the transmitter with mixers block 31 and the variable power amplifier 32 could be integrated into a single ASIC.

The GSM receiver 40 comprises, connected to each other in series, a first amplifier 41, a variable power amplifier 42 and a receiver with mixers block 43.

The first amplifier 41, the variable power amplifier 42 and the receiver with mixers block 43 are integrated in the presented embodiment into a single ASIC 44. This ASIC 44 is indicated in FIG. 2 with dotted lines. Alternatively, for example, only the variable power amplifier 42 and the receiver with mixers block 43 could be integrated into a single ASIC.

The mobile phone 1 further comprises a GSM antenna 25, which is connected to an antenna switch 21 and that antenna switch 21 is then connected to the amplifier 33 and to the first amplifier 41.

In addition, the mobile phone 1 comprises an automatic gain control AGC component 50, which has a controlling access to the variable gain attenuator 13 of the GPS receiver 10, to the variable power amplifier 32 of the GSM transmitter 30 and to the variable power amplifier 42 of the GSM receiver 40. Optionally, the AGC component 50 is connected in addition to the RF back end and DSP processing block 14, which is indicated in FIG. 2 with a second dashed line.

It is to be noted that input connections to the AGC component 50 are not shown. Such input may be received in particular from the transmitter with mixers block 31, the receiver with mixers block 43 and/or the RF back end and DSP processing block 14.

An RF signal received via the GPS antenna 15 is band pass filtered by the band pass filter 11, amplified by the LNA 12, attenuated by the variable gain attenuator 13 with a currently set gain, and then processed in a conventional way in the RF back end and DSP processing block 14. The processing in the RF back end and DSP processing block 14 may comprise for instance down-converting the RF signal to the base band, determining and tracking the C/A code in the signal employed by the GPS satellite which transmitted the signal, decoding the navigation information comprised in the tracked signal and performing positioning calculations for determining the current position of the mobile phone 1.

An RF signal having a carrier frequency of e.g. 1800 MHz, which is received by the GSM receiver 40 via the GSM antenna 25 in the scope of a mobile communication, is processed in a conventional way by the GSM receiver 40. The processing includes a first amplification by the first amplifier 41, an amplification by the variable power amplifier 42 with a currently set amplification factor, and a down-conversion in the receiver with mixers block 43.

A signal, which is to be transmitted by the GSM transmitter 30 in the scope of a mobile communication, is processed for transmission in a conventional way by the GSM transmitter 30. The processing includes in the transmitter with mixers block 31, to which the signal is provided, an up-conversion to an RF signal having a carrier frequency of e.g. 1800 MHz, an amplification by the variable power amplifier 32 with a currently set amplification factor, and a further amplification by the additional amplifier 33. The signal output by the additional amplifier 33 is then transmitted via the GSM antenna 25, causing wideband noise in the GPS band of 1575.42 MHz +/−5 MHz. This wideband noise is superimposed on any satellite signal reaching the GPS antenna 15, the GPS antenna 15 thus receiving a composite RF signal.

The adjustment of the respective attenuation which is applied by the variable gain attenuator 13 of the GPS receiver 10 to received RF signals will be explained in more detail in the following.

In a first state, the GSM transmitter 30 does not transmit any signals. In this first state, the AGC component 50 does not provide any AGC signal to the variable power amplifier 32 or to the variable gain attenuator 13. The attenuation applied by the variable gain attenuator 13 is set in this case to a predetermined low value, e.g. to a value of zero.

In a second state, the GSM transmitter 30 transmits signals via the GSM antenna 25, as described above. The amplification factor employed by the variable power amplifier 32 of the GSM transmitter 30 is adjusted by the AGC component 50 by means of an AGC signal in a known manner according to the current requirements, e.g. according to the current channel conditions.

DECT, like some other communication systems, is based on the principle that reception and transmission are operating at the same frequency, but in a synchronized manner in sequence, i.e. using different time slots. These communication system are referred to as TDD (Time Division Duplex) systems. When transmission and reception are using the same frequency, the signal level of received signals is a good estimate for the required power level for signals which are to be transmitted.

In GSM, just like for instance in US-TDMA, CDMA and W-CDMA, the received signal level and the transmission signal levels are therefore related to each other. When the signal level of received signals is high, a low transmission power level is used, and when the signal level of received signals is low, a high power transmission power level is used. The AGC component 50 monitors both, the received signal level and the transmitted signal level, and sets the amplification factor of the variable amplifier 32 and the variable amplifier 42 as needed.

Information on the power level of received GSM signals level can thus be used by the AGC component 50 to control in addition the satellite position system attenuation.

In case the amplification factor of the variable amplifier 32 is set by an AGC signal of the AGC component 50 to a low value, the GSM transmitter 30 transmits signals with a low power level. The AGC component 50 applies the same AGC signal in addition to the variable gain attenuator 13, thereby setting the attenuation of the variable gain attenuator 13 to a low value. Thus, a low attenuation is applied to any RF signals which is received via the GPS antenna 15.

When the power level of signals which are transmitted via the GSM antenna 25 is low, also the power level of the wide band noise reaching the GPS antenna 15 is low. Thus, if the power level of a satellite signal reaching the GPS antenna 15 is rather high, the resulting SNR of the composite RF signal will still be sufficiently high for a reliable evaluation. Due to the low attenuation of the received composite RF signal by the variable gain attenuator 13, the RF signal provided to the RF back end and DSP processing block 14 has a sufficiently high power level for enabling an evaluation. Accordingly, there is no error resulting in the evaluation due to too much noise. If the power level of a satellite signal reaching the GPS antenna 15 is rather low, in contrast, even a low wide band noise level will cause a rather low SNR of the composite RF signal. In this case, the low attenuation which is applied by the variable gain attenuator 13 to the received composite RF signal is sufficient for preventing an evaluation in the RF back end and DSP processing block 14, and thus an error in the evaluation due to too much noise.

In case the amplification factor is set by an AGC signal of the AGC component 50 to a high value, the GSM transmitter 30 transmits signals with a high power level. The AGC component 50 applies the same AGC signal in addition to the variable gain attenuator 13, thereby setting the attenuation of the variable gain attenuator 13 to a high value. Thus, a high attenuation is applied to any RF signals which is received via the GPS antenna 15.

When the power level of signals which are transmitted via the GSM antenna 25 is high, also the power level of the wide band noise reaching the GPS antenna 15 is high. Thus, even if the power level of a satellite signal reaching the GPS antenna 15 is rather high, the resulting SNR of the composite RF signal will too low for a reliable evaluation. Due to the high attenuation by the variable gain attenuator 13, all RF signals forwarded to the RF back end and DSP processing block 14 have a power level which is too low for enabling an evaluation. Accordingly, there is no error resulting in the evaluation due to too much noise.

As the same AGC signal is applied to the variable gain attenuator 13 and to the variable power amplifier 32, an increasing amplification factor results in an increasing attenuation so that the GPS receiver 30 is always adapted optimally to the current combination of wideband noise due to signals transmitted by the GSM transmitter 30 and the strength of arriving satellite signals.

It is to be understood that the variable gain attenuator 13 may be controlled in addition in a conventional manner within a lower range of possible gain values, e.g. depending on the strength of currently received RF signal. The additional control could be performed by a signal from the DSP in the RF back end and DSP processing block 14 of the GPS receiver 10 via the first indicated optional connection, which increases or decreases the attenuation in addition independently from the settings by the AGC component 50. Alternatively, a signal from the AGC component 50 and from the RF back end and DSP processing block 14 could be combined in a suitable way, in order to achieve a suitable attenuation. Such a combination of the information for an attenuation value could be carried out in the RF back end and DSP processing block 14, if an AGC information is delivered by the AGC component 50 to the RF back end and DSP processing block 14 via the second indicated optional connection. The delivered information can be a digital word or an analog signal value. Further alternatively, the AGC component 50 could take care as well of the additional control. In the latter case, the AGC signal provided by the AGC component 50 to the variable power amplifier 32 of the GSM transmitter 30 is adjusted according to the requirements of the additional control, before it is provided to the variable gain attenuator 13 of the GPS receiver 10.

Moreover, the attenuation, which is applied according to the invention to received satellite signals, does not necessarily have to be applied by the variable gain attenuator 13 or not exclusively by the variable gain attenuator 13.

In an alternative embodiment, the attenuating component could also be implemented after the mixers in the RF back end and DSP processing block 14.

The attenuation can also be distributed to several blocks, e.g. to the variable gain attenuator 13 and/or to the LNA 12 and/or to IF amplifiers and/or base band amplifiers in the RF back end and DSP processing block 14.

In case a super heterodyne receiver architecture is used for the GPS receiver 10, the RF back end and DSP processing block 14 can include several mixers and intermediate frequency filters, and a gain control function for controlling the gain of the variable gain attenuator 13 and/or of an attenuating component in the RF back end and DSP processing block 14 can be distributed to several frequencies.

It is to be noted that the described embodiment constitutes only one of a variety of possible embodiments of the invention.

What is claimed is:

1. A device comprising:
    a communication system transmitter configured to transmit signals via a radio interface in a first frequency band, said communication system transmitter including a variable amplifier configured to amplify signals which are to be transmitted by said communication system transmitter;
    a receiver configured to receive signals via a radio interface in a second frequency band, said receiver including an attenuator configured to attenuate signals received by said receiver; and
    at least one processor configured to set an attenuation which is applied by said attenuator to signals received by said receiver to a non-blocking higher value in case said communication system transmitter is transmitting signals with a power level exceeding a certain value, and to set an attenuation which is applied by said attenuator to signals received by said receiver to a lower value in case no signal is transmitted by said communication system transmitter, wherein said higher value is sufficiently high to prevent an evaluation of said attenuated received signals, when said attenuation is set to said higher value, wherein said processor is further configured to set said attenuation which is applied by said attenuator to signals received by said receiver to a value which increases with an increasing amplification factor of an amplification applied by said variable amplifier to signals which are to be transmitted by said communication system transmitter.

2. The device according to claim 1, wherein said device comprises a communication system section including said communication system transmitter and a receiver section including said receiver configured to receive signals in a second frequency band, and wherein said at least one processor is located in at least one of said communication system section and said receiver section.

3. The device according to claim 2, wherein said at least one processor includes a processor provided in said communication system section and a processor provided in said receiver section.

4. The device according to claim 1, wherein said receiver configured to receive signals in said second frequency band further includes an automatic gain control component configured to control the gain of signals received by said receiver configured to receive signals in the second frequency band, and wherein said at least one processor is configured to combine information from said automatic gain control component and information from a communication system section including said communication system transmitter configured to determine an attenuation to be set.

5. The device according to claim 1, wherein said at least one processor is configured to determine an attenuation to be set based on at least one of the power level of signals transmitted by said communication system transmitter and the power level of signals received by said receiver configured to receive signals in said second frequency band.

6. The device according to claim 1, further comprising a communication system receiver configured to receive signals in said first frequency band, wherein said at least one processor is configured to determine an attenuation to be set based on the power level of signals received by said communication system receiver.

7. The device according to claim 1, wherein said at least one processor is configured to determine an attenuation to be set based in addition on the power level of signals received by said receiver configured to receive signals in said second frequency band.

8. The device according to claim 1, wherein said attenuator comprises a variable gain attenuator, and wherein said variable gain attenuator is configured to apply at least part of said set attenuation to a signal received by said receiver by varying an attenuation applied by said variable gain attenuator to said received signal.

9. The device according to claim 8, wherein said receiver configured to receive signals in said second frequency band further includes an amplifier configured to amplify signals received via an antenna of said device, and a processor configured to process signals amplified by said amplifier, and wherein said variable gain attenuator is arranged between said amplifier and said processor configured to process signals amplified by said amplifier.

10. The device according to claim 1, wherein said attenuator comprises a variable amplifier, wherein said variable amplifier is configured to apply at least part of said set attenuation to a signal received by said receiver by varying an amplification factor of an amplification applied by said variable amplifier to said received signal.

11. The device according to claim 1, further comprising an antenna which is connected to said receiver configured to receive signals in said second frequency band, wherein said attenuator comprises a component configured to apply at least part of said set attenuation to a signal received by said receiver by detuning said antenna.

12. The device according to claim 1, wherein said attenuator comprises a component configured to apply at least part of said set attenuation to a signal received by said receiver configured to receive signals in said second frequency band by reducing at least for one component of said receiver a supplied operation voltage.

13. The device according to claim 1, wherein said receiver configured to receive signals in said second frequency band further includes a first converter configured to convert a received radio frequency signal into an intermediate frequency signal and a second converter configured to convert an intermediate frequency signal output by said first converter into a baseband signal, and wherein said attenuator configured to apply said set attenuation to a signal received by said receiver at least at one of a radio frequency, an intermediate frequency and a baseband frequency.

14. The device according to claim 1, further comprising evaluating means adapted to evaluate said attenuated received signals only in case said attenuated received signals have a sufficiently high power level.

15. The device according to claim 1, wherein said device is a mobile phone.

16. An apparatus comprising: at least one processor configured to set an attenuation which is applied by an attenuator of a receiver to signals received by a radio interface of said receiver in a second frequency band to a non-blocking higher value in case a transmitter of a communication system is transmitting signals via a radio interface in a first frequency band with a power level exceeding a certain value, and configured to set an attenuation which is applied by said attenuator to signals received by said receiver to a lower value in case no signal is transmitted by said communication system transmitter, wherein said higher value is sufficiently high to prevent an evaluation of said attenuated received signals, when said attenuation is set to said higher value, wherein said processor is further configured to set said attenuation which is applied by said attenuator to signals received by said receiver to a value which increases with an increasing amplification factor of an amplification applied by a variable amplifier to signals which are to be transmitted by said communication system transmitter.

17. The apparatus according to claim 16, wherein said receiver configured to receive signals in said second frequency band further includes an automatic gain control component configured to control the gain of signals received by said receiver configured to receive signals in the second frequency band, and wherein said at least one processor is configured to combine information from said automatic gain control component and information from a communication system section including said communication system transmitter for determining an attenuation to be set.

18. The apparatus according to claim 16, wherein said at least one processor is configured to determine an attenuation to be set based on at least one of the power level of signals transmitted by said communication system transmitter and the power level of signals received by said receiver configured to receive signals in said second frequency band.

19. The apparatus according to claim 16, wherein said device further comprises a communication system receiver configured to receive signals in said first frequency band, and wherein said at least one processor is configured to determine an attenuation to be set based on the power level of signals received by said communication system receiver.

20. The apparatus according to claim 16, further comprising evaluating means adapted to evaluate said attenuated received signals only in case said attenuated received signals have a sufficiently high power level.

21. A method for improving the performance of a receiver via a comprising:
attenuating a signal received by said receiver via a radio interface in a second frequency band with a non-blocking higher attenuation, in case a communication system transmitter in which said receiver is combined in a single device is transmitting signals via a radio interface in a first frequency band with a power level exceeding a certain value, and
attenuating a signal received by said receiver with a lower attenuation, in case no signal is transmitted by said communication system transmitter, wherein said higher attenuation is sufficiently high to prevent an evaluation of received signals attenuated with said higher attenuation,
wherein said attenuation is set to a value which increases with an increasing amplification factor of a variable amplification applied to signals which are to be transmitted by said communication system transmitter.

22. The method according to claim 21, wherein for determining an attenuation to be used, information provided by an automatic gain control controlling the gain of signals received by said receiver in the second frequency band and information provided by a communication system section including said communication system transmitter is combined.

23. The method according to claim 21, wherein an attenuation to be used is determined based on at least one of the power level of signals transmitted by said communication system transmitter and the power level of signals received by said receiver receiving signals in said second frequency band.

24. The method according to claim 21, wherein an attenuation to be used is determined based on the power level of signals received by a communication system receiver of said device in said first frequency band.

25. The method according to claim 21, wherein an attenuation to be used is determined based in addition on the power level of signals received by said receiver receiving signals in said second frequency band.

26. The method according to claim 21, wherein signals received by said receiver receiving signals in said second frequency band are attenuated by an attenuation applied by a variable gain attenuator.

27. The method according to claim 21, wherein signals received by said receiver receiving signals in said second frequency band are attenuated by reducing an amplification applied to said signals.

28. The method according to claim 21, wherein signals received by said receiver receiving signals in said second frequency band are attenuated by detuning an antenna forwarding signals to said receiver.

29. The method according to claim 21, wherein signals received by said receiver receiving signals in said second frequency band are attenuated by reducing at least for one component of said receiver a supplied operation voltage.

30. The method according to claim 21, wherein signals received by said receiver receiving signals in said second frequency band are attenuated at least at one of a radio frequency, an intermediate frequency and a baseband frequency.

31. The method according to claim 21, further comprising evaluating said attenuated received signals only in case said attenuated received signals have a sufficiently high power level.

32. An apparatus comprising:

means for setting an attenuation which is applied by means for attenuating to signals received by means for receiving via a radio interface in a second frequency band to a non-blocking higher value in case means for transmitting are transmitting signals via a radio interface in a first frequency band with a power level exceeding a certain value, and means for setting an attenuation which is applied by said means for attenuating to signals received by said means for receiving to a lower value in case no signal is transmitted by said means for transmitting, wherein said higher value is sufficiently high to prevent an evaluation of said attenuated received signals, when said attenuation is set to said higher value, wherein said attenuation which is applied by said means for attenuating to signals received by said means for receiving is set to a value which increases with an increasing amplification factor of an amplification applied by variable amplification means to signals which are to be transmitted by said means for transmitting.

* * * * *